(12) United States Patent
Penna et al.

(10) Patent No.: US 11,606,545 B2
(45) Date of Patent: *Mar. 14, 2023

(54) RENDERING WIDE COLOR GAMUT, TWO-DIMENSIONAL (2D) IMAGES ON THREE-DIMENSIONAL (3D) CAPABLE DISPLAYS

(71) Applicant: DOLBY LABORATORIES LICENSING CORPORATION, San Francisco, CA (US)

(72) Inventors: Ashley Nicole Penna, San Francisco, CA (US); Trevor Davies, Walnut Creek, CA (US); Martin J. Richards, Gig Harbor, WA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/696,745

(22) Filed: Mar. 16, 2022

(65) Prior Publication Data

US 2022/0210389 A1 Jun. 30, 2022

Related U.S. Application Data

(63) Continuation of application No. 17/414,330, filed as application No. PCT/US2019/065330 on Dec. 10, 2019, now Pat. No. 11,303,873.

(Continued)

(30) Foreign Application Priority Data

Feb. 7, 2019 (EP) .................................... 19155881

(51) Int. Cl.
*H04N 13/15* (2018.01)
*H04N 13/257* (2018.01)
(Continued)

(52) U.S. Cl.
CPC ........... *H04N 13/15* (2018.05); *H04N 9/3182* (2013.01); *H04N 13/257* (2018.05);
(Continued)

(58) Field of Classification Search
None
See application file for complete search history.

(56) References Cited

U.S. PATENT DOCUMENTS 8,115,787 B2 2/2012 Ben-Chorin
8,201,945 B2 6/2012 Ellinger
(Continued)

FOREIGN PATENT DOCUMENTS

CN 103026401 A 4/2013
CN 107517396 A 12/2017
(Continued)

OTHER PUBLICATIONS

I. Kauvar, S. Yang, L. Shi, I. McDowall, & G. Wetzstein, "Adaptive Color Display via Perceptually-driven Factored Spectral Projection", 34 ACM Transactions on Graphics 165:1-10 (Nov. 2015) (Year: 2015).*

(Continued)

*Primary Examiner* — David N Werner

(57) ABSTRACT

A system and method for displaying image data comprise receiving 2D video data, generating, from the video data, a first plurality of intensity values of virtual primaries of a first virtual color gamut and a second plurality intensity values of a second virtual color gamut, the first plurality of intensity values being below a luminance threshold and approximating a predefined color gamut and the second plurality of intensity values being above the luminance threshold, converting the first plurality of intensity values into a third plurality of intensity values of predefined primaries of a first projection head of a display system and the second plurality (Continued)

of intensity values into a fourth plurality of intensity values of predefined primaries of a second projection head of the display system, and dynamically adjusting pixel levels of spatial modulators of the display system based on the third plurality and the fourth plurality of intensity values.

14 Claims, 10 Drawing Sheets

Related U.S. Application Data

(60) Provisional application No. 62/785,470, filed on Dec. 27, 2018.

(51) Int. Cl.
| | | |
|---|---|---|
| *H04N 13/363* | (2018.01) | |
| *H04N 9/31* | (2006.01) | |
| *H04N 5/235* | (2006.01) | |
| *H04N 5/243* | (2006.01) | |

(52) U.S. Cl.
CPC ........... *H04N 13/363* (2018.05); *H04N 5/235* (2013.01); *H04N 5/2352* (2013.01); *H04N 5/2355* (2013.01); *H04N 5/243* (2013.01)

(56) References Cited

U.S. PATENT DOCUMENTS

| | | | |
|---|---|---|---|
| 8,884,994 | B2 | 11/2014 | Brown Elliott |
| 10,798,352 | B2 | 10/2020 | Davies |
| 11,303,873 | B2 * | 4/2022 | Penna ................. H04N 9/3147 |
| 2005/0206979 | A1 | 9/2005 | Tomizawa |
| 2007/0247402 | A1 * | 10/2007 | Delacour ............... G03B 21/26 |
| | | | 348/E9.027 |
| 2009/0073182 | A1 | 3/2009 | Ballerini |
| 2009/0190095 | A1 | 7/2009 | Ellinger |
| 2011/0285705 | A1 | 11/2011 | Ellinger |
| 2012/0194578 | A1 | 8/2012 | Znamenskiy |
| 2013/0063496 | A1 | 3/2013 | Basler |
| 2013/0128083 | A1 | 5/2013 | Liu |
| 2014/0292834 | A1 | 10/2014 | Ando |
| 2015/0356945 | A1 | 12/2015 | Fazzini |
| 2016/0187644 | A1 | 6/2016 | Bhakta |
| 2016/0240166 | A1 | 8/2016 | Kim |
| 2016/0360215 | A1 | 12/2016 | Rusanovskyy |
| 2017/0070712 | A1 | 3/2017 | Setomoto |
| 2017/0118461 | A1 | 4/2017 | Horiguchi |
| 2017/0324959 | A1 | 11/2017 | Olivier |
| 2018/0046431 | A1 | 2/2018 | Thagadur Shivappa |
| 2018/0192029 | A1 * | 7/2018 | Ming ................... A61B 5/7278 |
| 2018/0262744 | A1 | 9/2018 | Tadi |
| 2019/0014308 | A1 * | 1/2019 | Kiser .................. H04N 5/2355 |
| 2019/0238809 | A1 | 8/2019 | Davies |
| 2019/0252471 | A1 | 8/2019 | Inoue |

FOREIGN PATENT DOCUMENTS

| | | |
|---|---|---|
| CN | 105493489 B | 2/2019 |
| EP | 2070074 A1 | 6/2009 |
| EP | 3226203 A1 | 10/2017 |
| RU | 2294002 C2 | 2/2007 |
| WO | 2017223355 | 12/2017 |
| WO | 2021155056 A1 | 8/2021 |

OTHER PUBLICATIONS

S. Roth, I. Ben-David, M. Ben-Chorin, D. Eliav, & O. Ben-David, "10.2: Wide gamut, high brightness multiple primaries single panel projection displays", 34 Society for Info. Display Int'l Symposium Digest of Tech. Papers 118-121 (May 2003) (Year: 2003).*

Chen, Hai-Wei, et al "Going Beyond the Limit of an LCD's Color Gamut" Science & Applications, Sep. 2017, e17043.

Masaoka, K. et al "2D Representation of Display Color Gamut" inSID Symposium Digest of Technical Papers, May 2018, vol. 49, No. 1, pp. 1048-1051.

Zhu, R. et al "Realizing Rec. 2020 Color Gamut with Quantum Dot Displays" Sep. 7, 2015, 23(18):23680-93.

* cited by examiner

RENDERING WIDE COLOR GAMUT, TWO-DIMENSIONAL (2D) IMAGES ON THREE-DIMENSIONAL (3D) CAPABLE DISPLAYS

CROSS-REFERENCE TO RELATED APPLICATIONS

This application is continuation of U.S. patent application Ser. No. 17/414,330 filed Jun. 16, 2021, which is 371 US application of PCT/US2019/065330 filed Dec. 10, 2019, which claims priorities from U.S. Provisional Application No. 62/785,470 filed Dec. 27, 2018 and European Patent Application No. 19155881.6 filed Feb. 7, 2019, each of which is hereby incorporated by reference in its entirety.

BACKGROUND

Field of the Disclosure

This application relates generally to the rendering of wide color gamut images.

Description of Related Art

Displays capable of displaying three-dimensional (3D) images may display a left eye image and a right eye image using two distinct sets of primaries (6P) which, when viewed together, give the appearance of a 3D image. Such displays may also be utilized to display two-dimensional (2D) images.

SUMMARY OF THE DISCLOSURE

Various aspects of the present disclosure relate to systems and methods for improved rendering of two 2D images on 6P 3D projectors and display systems (in particular, spectral separation 3D projectors and display systems).

In one exemplary aspect of the present disclosure, there is provided a dual-head projection system comprising a first projection head, a second projection head, at least one spatial modulator, and an electronic processor. The electronic processor is configured to receive 2D video data, generate, from the video data, a first plurality of intensity values of virtual primaries of a first virtual color gamut and a second plurality intensity values of virtual primaries of a second virtual color gamut, the first plurality of intensity values being below a luminance threshold and approximating a predefined color gamut and the second plurality of intensity values being above the luminance threshold, convert the first plurality of intensity values into a third plurality of intensity values of predefined primaries of the first projection head and the second plurality of intensity values into a fourth plurality of intensity values of predefined primaries of the second projection head, and dynamically adjust pixel levels of the spatial modulators of the first projection head and the second projection head.

In another exemplary aspect of the present disclosure, there is provided a method for displaying image data. The method comprises receiving 2D video data, generating, from the video data, a first plurality of intensity values of virtual primaries of a first virtual color gamut and a second plurality intensity values of a second virtual color gamut, the first plurality of intensity values of the first virtual color gamut being below a luminance threshold and approximating a predefined color gamut and the second plurality of intensity values being above the luminance threshold, converting the first plurality of intensity values into a third plurality of intensity values of predefined primaries of a first projection head of a display system and the second plurality of intensity values into a fourth plurality of intensity values of predefined primaries of a second projection head of the display system, and dynamically adjusting pixel levels of spatial modulators of the first and second projection heads of the display system based on the third plurality of intensity values and the fourth plurality of intensity values.

In another exemplary aspect of the present disclosure, there is provided a method for displaying image data. The method comprises receiving video data, generating, based on an intensity level of the video data, a first plurality of intensity values associated with the first virtual color gamut, generating, based on a comparison between the intensity level and at least one predetermined threshold, a second plurality of intensity values associated with the second virtual color gamut, generating, based on the first plurality and the second plurality of intensity values, a third plurality of intensity values and a fourth plurality of intensity values associated with the plurality of primary display colors, and providing the third plurality of intensity values and the fourth plurality of intensity values to at least one spatial light modulator.

In another exemplary aspect of the present disclosure, there is provided a non-transitory computer-readable medium storing instructions that, when executed by a processor of a computer, cause the computer to perform operations comprising receiving 2D video data including tristimulus pixel values of predefined primaries of a predefined color space, generating, from the video data, a first plurality of intensity values of virtual primaries of a first virtual color gamut and a second plurality intensity values of a second virtual color gamut to approximate a predefined color gamut, the first plurality of intensity values being below a luminance threshold of the first virtual color gamut and the second plurality of intensity values being above the luminance threshold, converting, via a blending function, the first plurality of intensity values into a third plurality of intensity values of the predefined primaries and the second plurality of intensity values into a fourth plurality of intensity values of the predefined primaries, and dynamically adjusting pixel levels of at least one spatial modulator of a dual-head projection system based on the third plurality of intensity values and the fourth plurality of intensity values.

In this manner, various aspects of the present disclosure provide for the rendering of 2D images from a 3D projection device, and improvements in at least the technical fields of image projection, signal processing, and the like.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts, and explain various principles and advantages of those embodiments.

Figure 1A:
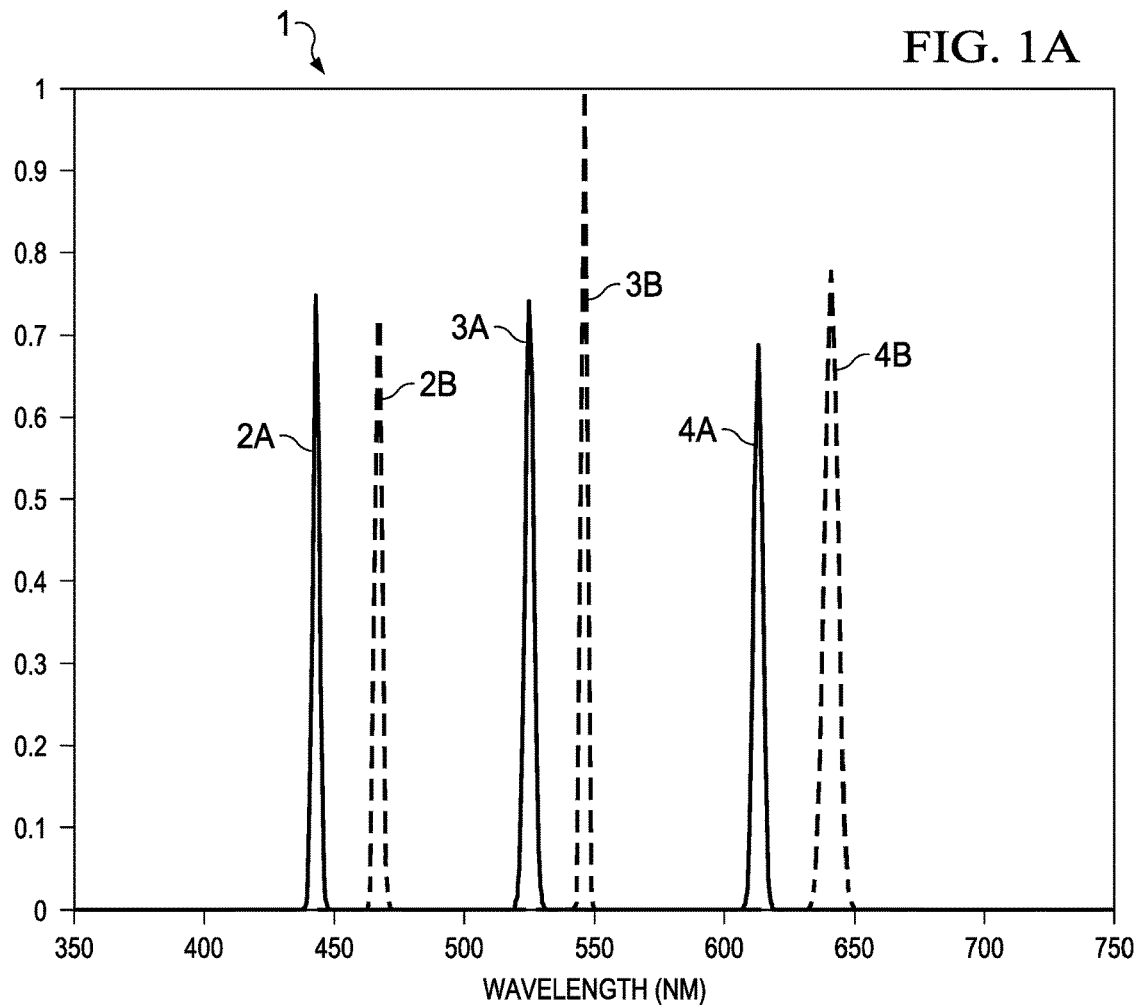
FIG. 1A is a spectrum diagram of a 6P projection system according to various aspects of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

As previously mentioned, some 6P displays configured to project 3D images may be utilized to project/display 2D images. When projecting 3D images, the six primaries are used to display the left-eye and right-eye images using one set of three (red, green, and blue) primaries for the left-eye image and the other set of three primaries for the right-eye image. 3D glasses for use with such a display may have corresponding filters (such as band pass filters) to allow each eye to see the appropriate image. Two-dimensional images can be displayed by 3D displays by driving each pair of primary light sources with the same data without the need to for a viewer to wear 3D glasses. For example, the 2D red data values are used to drive both the red1 and the red2 primaries. Similarly, the 2D green data values are used to drive both the green1 and the green2 primaries, and the 2D blue data values are used to drive both the blue1 and blue2 primaries. The system is calibrated with the combined primaries and images can be produced. However, the resulting color gamut can be limited significantly with respect to a desired color gamut (for example, the established Rec 2020 gamut).

This disclosure and aspects thereof can be embodied in various forms, including hardware or circuits controlled by computer-implemented methods, computer program products, computer systems and networks, user interfaces, and application programming interfaces; as well as hardware-implemented methods, signal processing circuits, memory arrays, application specific integrated circuits, field programmable gate arrays, and the like. The foregoing summary is intended solely to give a general idea of various aspects of the present disclosure, and does not limit the scope of the disclosure in any way.

In the following description, numerous details are set forth, such as circuit configurations, waveform timings, circuit operations, and the like, in order to provide an understanding of one or more aspects of the present disclosure. It will be readily apparent to one skilled in the art that these specific details are merely exemplary and not intended to limit the scope of this application.

Moreover, while the present disclosure focuses mainly on examples where the received video data is of Rec2020, it will be understood that this is merely one example of an implementation and that other color spaced may be utilized. It will further be understood that the disclosed systems and methods can be used in any projection system to improve the rendering of 2D images on six primary displays.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components. For example, in some embodiments the system 100 of FIGS. 1B and 1C below includes more than one light source 102.

As described above, some 3D displays, referred to as 6P systems, simultaneously display a left eye and right eye image using two distinct sets of primaries. FIG. 1A is a spectral diagram 1 of a 6P system in accordance with some embodiments. The diagram 1 includes three short wavelengths 2A, 3A, and 4A (referred to herein as short primaries) and three long wavelengths 2B, 3B, and 4B (referred to herein as long primaries). The example display systems described herein are configured to utilize the short primaries 2A, 3A, and 4A for the left eye image (for example, via a designated left projector) and the long primaries 2B, 3B, and 4B for the right eye image (for example, via a designated right projector). It should be understood that, in further embodiments, a combination of short and long primaries may be utilized for each eye image. As explained in more detail below, each projector outputs a modulated light output (of the designated primaries of the projector) onto a display or viewing screen. In the embodiments described herein, both the left eye image and the right eye image are simultaneously displayed.

Figure 1B:
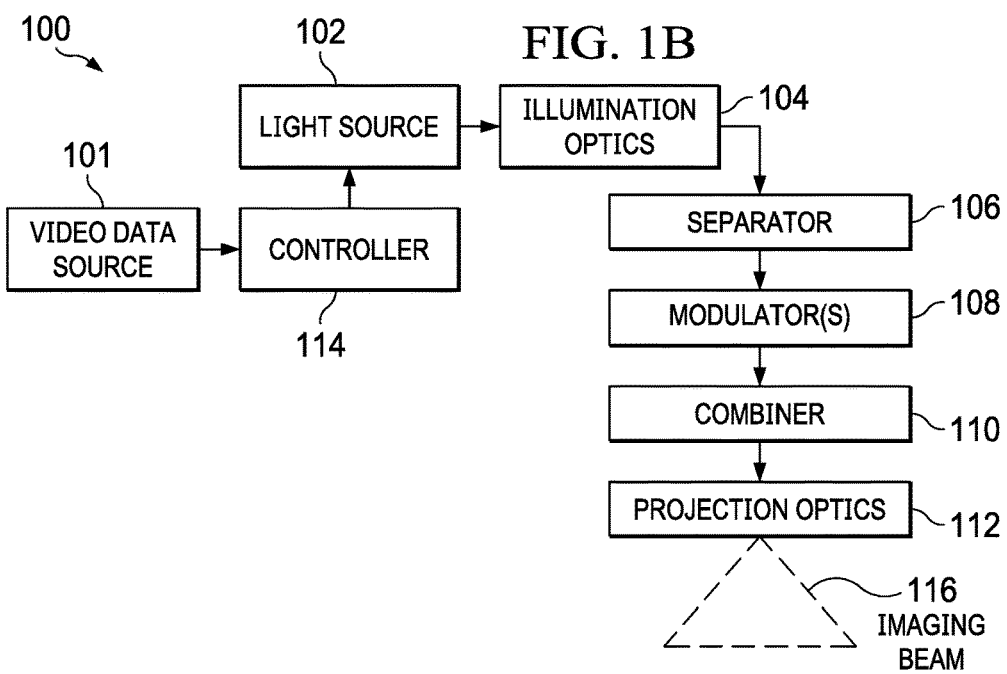
FIG. 1B is a block diagram of a projection system according to various aspects of the present disclosure.
Figure 1C:
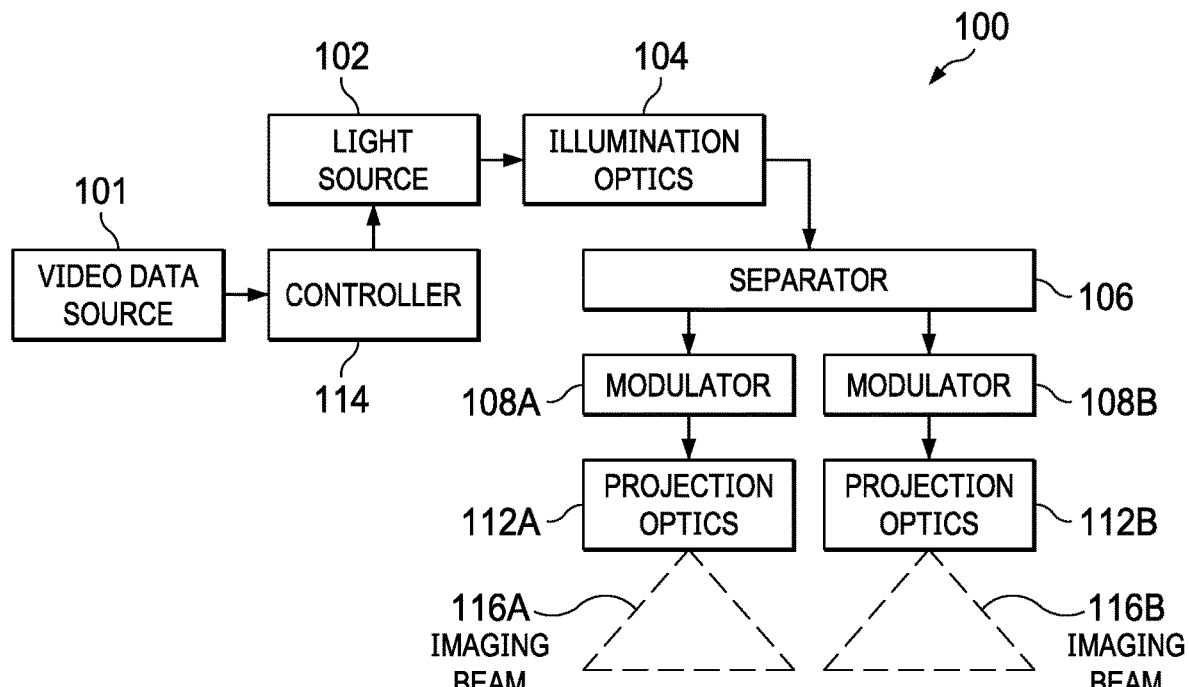
FIG. 1C is a block diagram of a projection system according to various aspects of the present disclosure.

FIGS. 1B and 1C are each a block diagram of exemplary display systems 100 in accordance with some embodiments. Each system includes at least some similarly configured components, which are labelled as such. The display system 100 is configured to display 3D and 2D video data received from a video data source 101. The display system 100 may be any kind of system configured to display images, for example, a projection system or a light-emitting diode (LED) display system. The display system 100 includes a light source 102, illumination optics 104, a separator 106, one or more modulators 108, a combiner 110, projection optics 112, and a controller 114. While FIGS. 1B and 1C illustrate one light source 102, display systems 100 in accordance with some embodiments may contain multiple light sources 102. The components of the system 100 may be housed in a single projection device (such as a single projector) or, in some embodiments, multiple devices. For example, in some embodiments, the light sources, the modulators, and other components of the display system 100 can be separated into two or more separate, coordinated projection devices.

The light source 102 is driven by the controller 114 to produce an illumination beam including, in the illustrated embodiment, six primary colors. The illumination beam is directed through illumination optics 104 and into color separator 106. The color separator 106 separates the illumination beam into the six primary beams and directs each primary beam to an associated one of spatial light modulators (SLMs) 108. Each modulator 108 modulates the primary illumination beams based on input from the controller 114, as described in more detail below. The projection optics 112 focus the modulated beam to form an imaging beam 116. The imaging beam 116 is then projected to create an image, for example, onto a viewing surface (not shown). In the exemplary system of FIG. 1B, the left- and right-eye images may be alternatingly projected (also called "time divisional multiplexing").

In some embodiments, each primary color may be associated with an individual modulator 108. Alternatively, as shown in FIG. 1B, the number of modulators may be reduced, for example by using a field sequential modulation scheme. In some embodiments, the modulators can include a plurality of modulators for each primary color, as, for example, in a dual modulation projector. In some embodiments, each modulator 108 is associated with a set of primary colors. For example, as described above in regard to FIG. 1A, a 6P system, as shown in FIG. 1C, may include a left projector and a right projector. FIG. 1C illustrates a dual head display system 100, which includes separate modulators 108A and 108B, projection optics 112A and 112B, and two resulting imaging beams 116A and 116B, each set of which are designated for a left eye channel and a right eye channel respectively. The modulator 108A, projection optics 112A, and the resulting imaging beam 116A may be considered components of a left projector (projection head) and the modulator 108B, projection optics 112B, and the resulting imaging beam 116B may be considered components of a right projector (projection head). As described above, light outputs from both channels are shown simultaneously to produce a single resulting image on a display or screen. Furthermore, while FIGS. 1B and 1C illustrate video data source 101 as being separate from the display system 100, in some embodiments the video data source 101 may be internal to the display system 100 (for example, in a memory associated with the display system 100).

Figure 2:
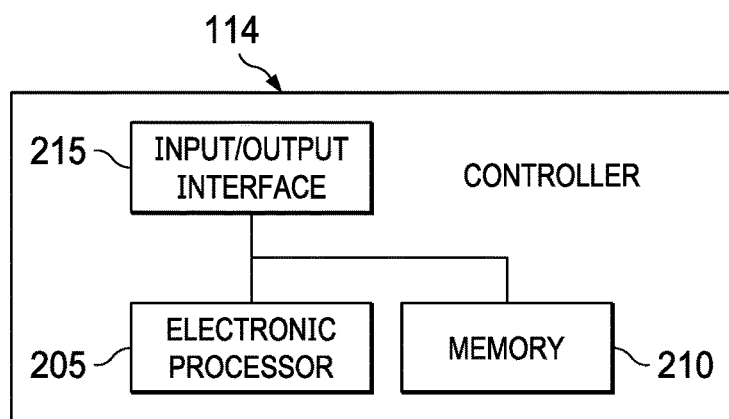
FIG. 2 is a block diagram of a controller included in the system of FIGS. 1B and 1C according to various aspects of the present disclosure.

FIG. 2 is a block diagram of the controller 114 in accordance with some embodiments. The controller 114 includes an electronic processor 205, a memory 210, and an input/output interface 215. The electronic processor 205 obtains and provides information (for example, from the memory 210 and/or the input/output interface 215), and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 may include multiple cores or individual processing units. The electronic processor 205 is configured to retrieve from the memory 210 and execute, among other things, software related to the control processes and methods described herein.

The memory 210 can include one or more non-transitory computer-readable media, and includes a program storage area and a data storage area. The program storage area and the data storage area can include combinations of different types of memory, as described herein. The memory 210 may take the form of any non-transitory computer-readable medium.

The input/output interface 215 is configured to receive input and to provide system output. The input/output interface 215 obtains information and signals from, and provides information and signals to (for example, over one or more wired and/or wireless connections) devices both internal and external to the display system 100, for example, the light source 102, the modulator(s) 108, and the video data source 101.

Figure 3:
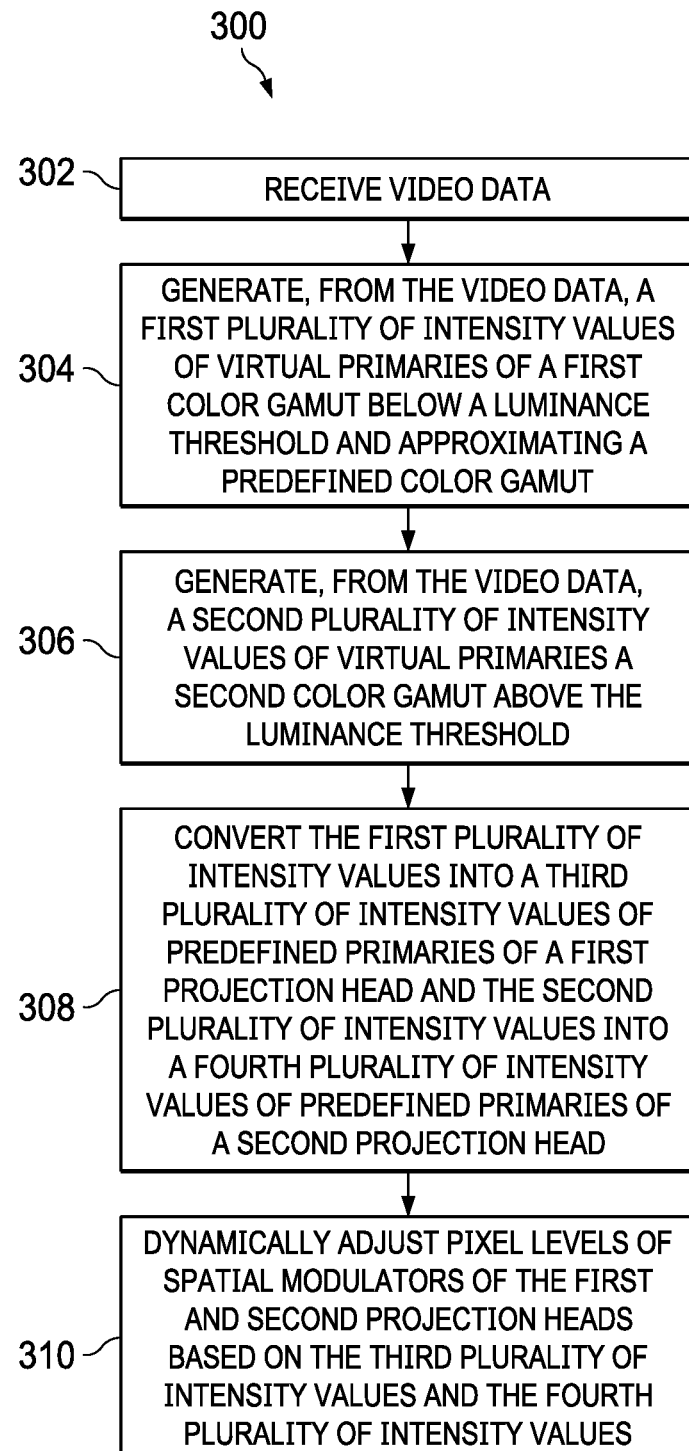
FIG. 3 is flowchart illustrating a method implemented by the controller of FIG. 2 according to various aspects of the present disclosure.

FIG. 3 is a flowchart illustrating an example method 300 of operating a projection system in accordance with some embodiments. As an example, the method 300 is described as being performed by the controller 114 illustrated in FIGS. 1B and 1C and, in particular, the electronic processor 205 illustrated in FIG. 2.

At block 302, the electronic processor 205 receives video data from a video data source, such as the video data source 101 illustrated in FIGS. 1B and 1C. The video data may include a series of tristimulus pixel values from a video content stream or file. In some embodiments, the video data includes pixel values in a color space (or gamut) such as Rec2020 (also referred to as ITU-R Recommendation BT.2020). At block 304, the electronic processor 205 generates, from the video data, a first plurality of intensity values of virtual primaries of a first color gamut and, at block 306, generates, from the video data, a second plurality of intensity values of virtual primaries of a second color gamut. In particular, a gamut volume for 2D images is split into two virtual gamuts: gamut A and gamut B. Each gamut includes virtual primaries that are specific blends of the predefined primaries. As explained in more detail below, gamut A is optimized to be as close to a predefined color gamut, for example a defined standard color space (for example, Rec2020), while gamut B is utilized for any residual energy from the predefined primaries. In other words, gamut A is used for lower luminance levels and gamut B is added to achieve higher luminance levels when applicable. In some embodiments, gamut A is optimized to achieve the largest possible color gamut.

Returning to FIG. 3, at block 308, the electronic processor 205 converts the first plurality of intensity values into a third plurality of intensity values of predefined primaries of a first eye channel (for example, a channel of a first projection head) and the second plurality of intensity values into a fourth plurality of intensity values of predefined primaries of a second eye channel (for example, a channel of a second projection head).

In some embodiments, a blending function is applied to gamut A and gamut B to optimize each gamut to be close to the color space of the video data (in the present example, Rec2020). In other words, in these embodiments, the electronic processor 205 converts, e.g. via one or more blending function, the first plurality of intensity values and the second plurality of intensity values into a third plurality of intensity values of predefined primaries of a first eye channel (for example, a channel of a first projection head). The electronic processor 205 also converts, e.g. via one or more blending function, the first plurality of intensity values and the second plurality of intensity values into a fourth plurality of intensity values of predefined primaries of a second eye channel (for example, a channel of a second projection head).

Equations [1] and [2] below illustrate the blending function performed at block 308 for the left eye channel and the right eye channel respectively.

$$\begin{bmatrix} R_L \\ G_L \\ B_L \end{bmatrix} = [B_{AL}] \begin{bmatrix} R_A \\ G_A \\ B_A \end{bmatrix} + [B_{BL}] \begin{bmatrix} R_B \\ G_B \\ B_B \end{bmatrix} \qquad [1]$$

and $$\begin{bmatrix} R_S \\ G_S \\ B_S \end{bmatrix} = [B_{AS}] \begin{bmatrix} R_A \\ G_A \\ B_A \end{bmatrix} + [B_{BS}] \begin{bmatrix} R_B \\ G_B \\ B_B \end{bmatrix} \qquad [2]$$

The matrix of $R_L$ $G_L$ $B_L$ corresponds to the third plurality of intensity values, e.g. primaries of the right eye channel, and the matrix of $R_S$ $G_S$ $B_S$ corresponds to the fourth plurality of intensity values, e.g. primaries of the left eye channel, in which R refers to a red primary, G refers to a green primary, B refers to a blue primary, the subscript L refers to "long" wavelength primaries, and the subscript S refers to "short" wavelength primaries. In some embodiments, the right eye channel may include the short wavelength primaries while the left eye channel includes the long wavelength primaries. In both equations, gamut A (the matrix including $R_A$ $G_A$ $B_A$) and gamut B (the matrix including $R_B$ $G_B$ $B_B$) of each channel is scaled by a blend matrix (the matrices of $B_{AL}$, $B_{BL}$, $B_{AS}$, and $B_{BS}$). The particular values of the blend matrices may be predetermined values determined based on the location of the primaries and the predetermined color space. The particular values may also be dependent on the projection/display system used (for example, the type of projector head). Example methods of determination of each blend matrices are described in more detail below. In the present example, the following blend matrices values are used:

$$[B_{AL}] = \begin{bmatrix} 0 & 0 & 0 \\ 0.0096 & 0.2626 & 0 \\ 0 & 0 & 0.9733 \end{bmatrix}$$

$$[B_{BL}] = \begin{bmatrix} 1.0000 & 0 & 0 \\ 0 & 0.7278 & 0 \\ 0 & 0 & 0.0267 \end{bmatrix}$$

$$[B_{AS}] = \begin{bmatrix} 0.9904 & 0 & 0 \\ 0 & 0.7374 & 0.0267 \\ 0 & 0 & 0 \end{bmatrix}$$

$$[B_{BS}] = \begin{bmatrix} 0.0096 & 0 & 0 \\ 0 & 0.2359 & 0 \\ 0 & 0 & 1.0000 \end{bmatrix}$$

Returning to FIG. 3, at block 310, the electronic processor 205 dynamically adjusts pixel levels of at least one spatial modulator, such as the modulator 108 illustrated in FIGS. 1B and C, based on the third plurality of intensity values and the fourth plurality of intensity values. In embodiments where the system 100 is a dual head projection system, pixel levels of the modulator of each of the projection heads are adjusted.

As mentioned above, gamut A is optimized to be as close to a predefined color gamut, for example a defined standard color space (for example, Rec2020), while gamut B is utilized for any residual energy from the predefined primaries. Below two exemplary methods implemented by the processor 205 to process received video data into gamuts A and B are described.

One method to optimize gamut A is by scaling (compressing) the chromaticities of the video data to fit within the achievable gamut volume of the light source 102, referred to herein as gamut scaling. In the gamut scaling method, two functions are defined:

$$f_l(C) = \text{if } (C < 0.5), C, \text{ else } 0.5$$

$$f_u(C) = C - f_l(C)$$

$$C \in R_{2020}, G_{2020}, B_{2020}$$

The variable C represents the pixel values of the received video data, which is here assumed to be tristimulus Rec2020 data. The function $f_l(C)$ represents a lookup table for gamut A while the function $f_u(C)$ represents a lookup table for gamut B. In the present example, the function $f_l(C)$ defines a linear ramp increasing from 0 to 0.5 and flat-lining beyond 0.5 while the function $f_u(C)$ defines a flat line from 0 to 0.5 and a linear ramp increasing from 0.5. The value 0.5 corresponds to a luminance threshold. In some embodiments, a different luminance threshold may be used.

For each of the pixel values of the received video data, gamut A and gamut B are derived as follows:

$$\begin{bmatrix} R_A \\ G_A \\ B_A \end{bmatrix} = \begin{bmatrix} f_l(R_{2020}) \\ f_l(G_{2020}) \\ f_l(B_{2020}) \end{bmatrix}$$

$$\begin{bmatrix} R_B \\ G_B \\ B_B \end{bmatrix} = \begin{bmatrix} f_u(R_{2020}) \\ f_u(G_{2020}) \\ f_u(B_{2020}) \end{bmatrix}$$

In other words, for each primary channel of the incoming video data $R_{2020}$, $G_{2020}$, and $B_{2020}$, the pixel values with a luminance level under 0.5 (corresponding to 50% of the total luminance range of the system 100 and 100% of the luminance range of gamut A) are included within gamut A while the pixel values that exceed 0.5 (meaning that they are outside of the luminance range of gamut A) are allocated to gamut B. The derived gamut A and gamut B signals are then converted to the defined primaries as described above in regard to block 308 and equations 1 and 2.

Another method to process received video data into gamut A is by clipping chromaticities to fit within gamuts A and B to fit within the achievable gamut volume of the light source 102. First, the transformation relationship $[C]_A$ and $[C]_B$ from the color space of the source 102 to gamut A and gamut B, respectively, is defined. The derivation may be performed as follows.

Knowing the normalized primary matrices for the left channel and right channel, arbitrary points in both channels may be defined as:

$$\begin{bmatrix} X \\ Y \\ Z \end{bmatrix} = [NPM]_{LLL} \begin{bmatrix} R_L \\ G_L \\ B_L \end{bmatrix} + [NPM]_{SSS} \begin{bmatrix} R_S \\ G_S \\ B_S \end{bmatrix}$$

Where the matrix of X, Y, and Z corresponds to an arbitrary point, the matrices of $NPM_{LLL}$ and $NPM_{SSS}$ correspond to the normalized primary matrices of the right eye channel and the left eye channel respectively, and the matrices of $R_L$, $G_L$, and $B_L$ and $R_S$, $G_S$, and $B_S$ correspond to non-normalized matrices of the right eye channel and the left eye channel respectively.

The blending functions defined in equations 1 and 2 above are each substituted in as the non-normalized matrices of the right eye channel and the left eye channel respectively.

$$\begin{bmatrix} X \\ Y \\ Z \end{bmatrix} = [NPM]_{LLL} \left\{ [B_{AL}] \begin{bmatrix} R_A \\ G_A \\ B_A \end{bmatrix} + [B_{BL}] \begin{bmatrix} R_B \\ G_B \\ B_B \end{bmatrix} \right\} +$$

$$[NPM]_{SSS} \left\{ [B_{AS}] \begin{bmatrix} R_A \\ G_A \\ B_A \end{bmatrix} + [B_{BS}] \begin{bmatrix} R_B \\ G_B \\ B_B \end{bmatrix} \right\}$$

Converting the above formula into terms of primary matrices, the formula becomes:

$$\begin{bmatrix} X \\ Y \\ Z \end{bmatrix} = [PM]_A \begin{bmatrix} R_A \\ G_A \\ B_A \end{bmatrix} + [PM]_B \begin{bmatrix} R_B \\ G_B \\ B_B \end{bmatrix}$$

wherein $$[PM]_A = [NPM]_{LLL}[B_{AL}] + [NPM]_{SSS}[B_{AS}]$$

and $$[PM]_B = [NPM]_{SSS}[B_{BS}] + [NPM]_{LLL}[B_{BL}]$$

Knowing the normalized primary matrix for Rec2020 below:

$$[NPM]_{2020},$$

the transformation from the source Rec2020 vectors to gamuts A and B are respectively:

$$\begin{bmatrix} R \\ G \\ B \end{bmatrix}_A = [C]_A \begin{bmatrix} R \\ G \\ B \end{bmatrix}_{2020} \quad \text{where } [C]_A = [PM]_A^{-1}[NPM]_{2020}$$

and $$\begin{bmatrix} R \\ G \\ B \end{bmatrix}_B = [C]_B \begin{bmatrix} R \\ G \\ B \end{bmatrix}_{2020} \quad \text{where } [C]_B = [PM]_B^{-1}[NPM]_{2020}$$

As mentioned above, gamut A is used for lower luminance levels while gamut B is utilized where applicable to achieve higher luminance levels. In contrast to the gamut scaling method, where the luminance range of gamut A is the same across all channels, here a threshold vector is utilized as the luminance threshold, meaning that the luminance range of gamut A varies per channel. The threshold vector representing the transition between the 'A' and 'B' gamuts in Rec2020 space can be found as follows:

$$\begin{bmatrix} T_R \\ T_G \\ T_B \end{bmatrix}_{2020} = [C]_A^{-1} \begin{bmatrix} 0.5 \\ 0.5 \\ 0.5 \end{bmatrix}$$

In other words, each threshold in the threshold vector is determined based on a transform of the first virtual color gamut to the predefined color gamut.

The following functions are then defined:

$$f_l(C) = \text{if } (C < T_C), C, \text{ else } T_C$$

$$f_u(C) = C - f_l(C)$$

$$C \in R_{2020}, G_{2020}, B_{2020}$$

The variable C represents the pixel values of the received video data, which is here assumed to be tristimulus Rec2020 data. Similar to the functions $f_l(C)$ and $f_u(C)$ of the gamut scaling method described above, the function $f_l(C)$ again represents a lookup table for gamut A while the function $f_u(C)$ represents a lookup table for gamut B. In the present example, the function $f_l(C)$ defines a linear ramp increasing from 0 to the threshold value of the particular channel as defined in the threshold vector and flat-lining beyond the particular threshold value while the function $f_u(C)$ defines a flat line from 0 to the particular threshold value and a linear ramp increasing from the particular threshold value. Again, here the particular threshold values respectively correspond to a luminance threshold of each of the channels of gamut A. In some embodiments, the functions $f_l(C)$ and $f_u(C)$ may define transitions other than the linear ramps described above (so long as the sum of the functions is equal to 1). For example, either or both functions $f_l(C)$ and $f_u(C)$ may define a curve to the flat line.

For each of the pixel values of the received video data, gamut A and gamut B are derived as follows:

$$\begin{bmatrix} R_A \\ G_A \\ B_A \end{bmatrix} = \begin{bmatrix} f_l(R_{2020}) \\ f_l(G_{2020}) \\ f_l(B_{2020}) \end{bmatrix}$$

$$\begin{bmatrix} R_B \\ G_B \\ B_B \end{bmatrix} = \begin{bmatrix} f_u(R_{2020}) \\ f_u(G_{2020}) \\ f_u(B_{2020}) \end{bmatrix}$$

In other words, for each primary channel of the incoming video data $R_{2020}$, $G_{2020}$, and $B_{2020}$, the pixel values with a luminance level under the corresponding threshold value of the threshold vector $T_R$, $T_G$, and $T_B$ (corresponding to a specific luminance range of gamut A) are included within gamut A while the pixel values that exceed the particular threshold value (meaning that they are outside of the luminance range of gamut A) are allocated to gamut B.

Any intensity values of the derived gamut A and gamut B that are negative values are then clipped to 0 (or white).

$$\begin{bmatrix} R_A \\ G_A \\ B_A \end{bmatrix} = \begin{bmatrix} \max(R_A, 0) \\ \max(G_A, 0) \\ \max(B_A, 0) \end{bmatrix} \quad [3]$$

$$\begin{bmatrix} R_B \\ G_B \\ B_B \end{bmatrix} = \begin{bmatrix} \max(R_B, 0) \\ \max(G_B, 0) \\ \max(B_B, 0) \end{bmatrix} \quad [4]$$

The derived gamut A and gamut B signals are then converted to the defined primaries as described above in regard to block 308 and equations 1 and 2.

The gamut clipping method clips colors to the edge of gamuts A and B which can be created approximately the same for any projector system. In other words, colors produced by one projector may be faithfully reproduced by any other kind of projector, regardless of whether or not the source primaries are the same.

Alternatively, the blend function may be applied to gamuts A and B before clipping the negative values. By applying the blending function to each gamut, the values of each gamut are converted to be in terms of the predefined primaries of the color space of the received video data. The clipping may then be applied as shown below.

$$\begin{bmatrix} R_L \\ G_L \\ B_L \end{bmatrix} = \begin{bmatrix} \max(R_L, 0) \\ \max(G_L, 0) \\ \max(B_L, 0) \end{bmatrix}$$

$$\begin{bmatrix} R_S \\ G_S \\ B_S \end{bmatrix} = \begin{bmatrix} \max(R_S, 0) \\ \max(G_S, 0) \\ \max(B_S, 0) \end{bmatrix}$$

This method maximizes the gamut coverage for the particular primaries of any projector system.

Figure 4:
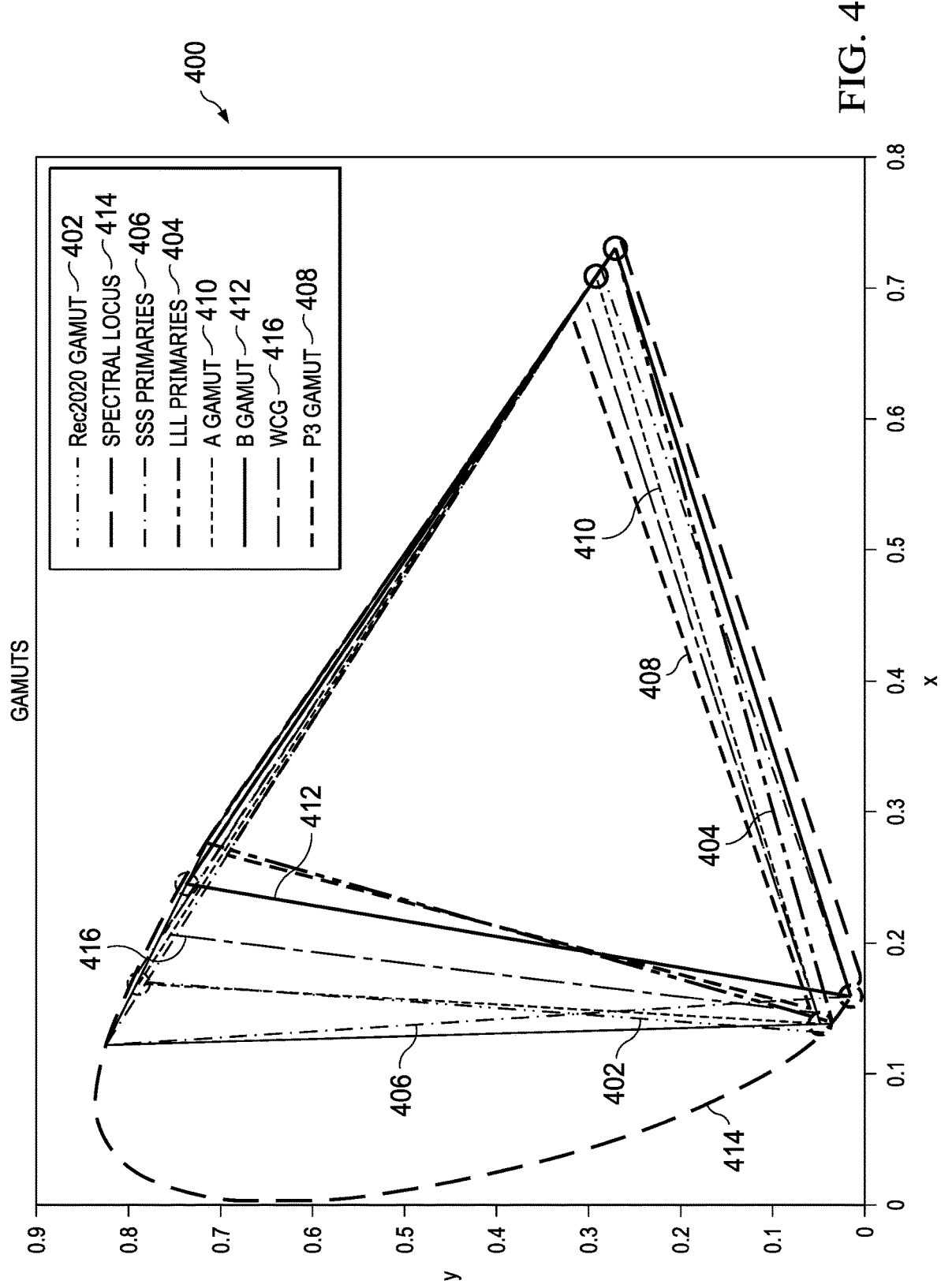
FIG. 4 is a chromaticity diagram according to various aspects of the present disclosure.

FIG. 4 illustrates a chromaticity diagram 400. The chart 400 includes color gamuts associated with the display system 100 and the target color gamut (here, Rec2020). Gamut 402 is the Rec2020 gamut. Gamut 404 is the gamut defined by the (long) primaries $R_L$, $G_L$, and $B_L$ of the right eye channel (the LLL primaries) while gamut 406 is the gamut defined by the (short) primaries $R_S$, $G_S$, and $B_S$ of the left eye channel (the SSS primaries). Gamut 416 is the gamut defined by driving the primaries of both the right eye and left eye channels with the same values (the "WCG" gamut). As illustrated, gamut 408 differs significantly from the Rec2020 gamut 402. Gamut 410 is the virtual color gamut A and gamut 412 is the virtual color gamut B. As described above, gamut A is defined as a combination of virtual primaries to approximate the Rec2020 gamut 402 as close as possible while gamut B is defined by the remaining energy output of the virtual primaries after the energy utilized for gamut A has been subtracted. As shown, gamut A (gamut 410) matches the Rec2020 gamut 402 more closely as compared to the summation gamut 408.

Figure 5A:
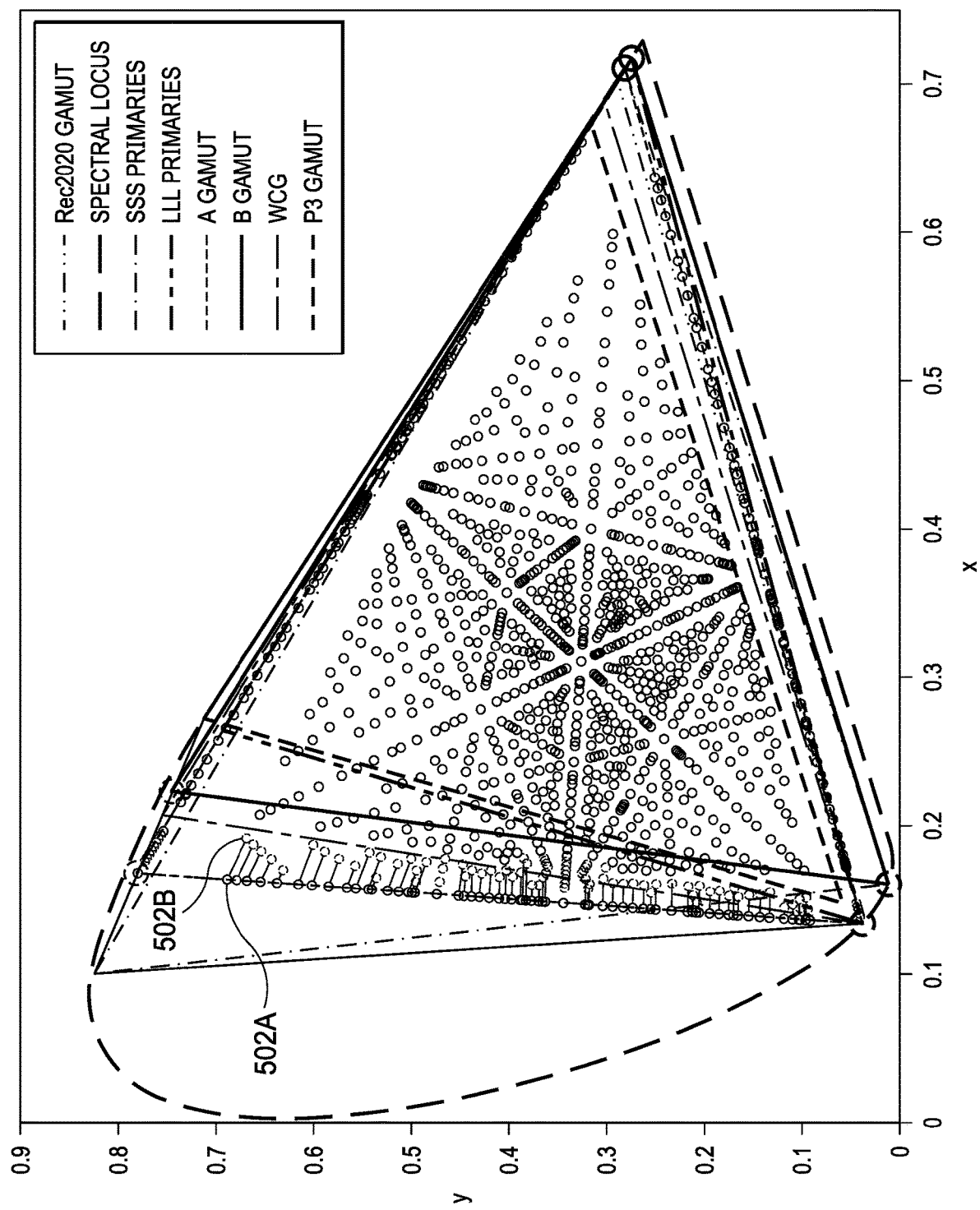
FIG. 5A is a chromaticity diagram according to various aspects of the present disclosure.

FIG. 5A illustrates a chromaticity diagram 500A including the gamuts 402, 404, 406, 408, 410, and 412 described above in regard to FIG. 4. The chromaticity diagram 500A includes the input chromaticity (black) and the resulting output chromaticity (grey) achieved using the gamut clipping method described above. Lines connecting any input chromaticity point to an output chromaticity point (for example, the line connecting input point 502A to output point 502B) indicate how the input color was altered (if needed to be). Note, in the illustrated chart 500A, the maximum input is less than the luminance threshold and thus gamut B is not utilized and that the second clipping method described above was used.

Figure 5B:
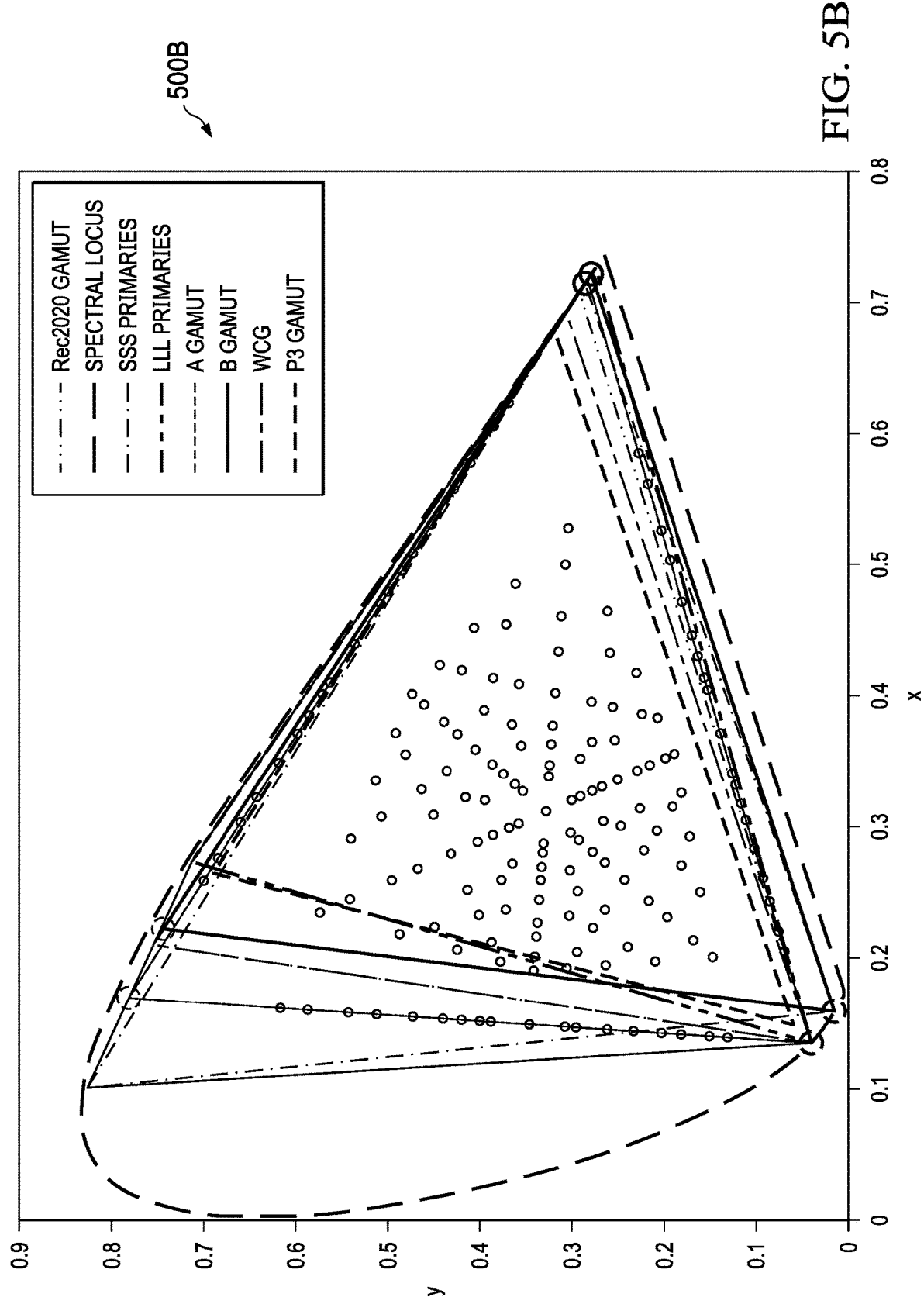
FIG. 5B is a chromaticity diagram according to various aspects of the present disclosure.

FIG. 5B illustrates a chromaticity diagram 500B including the gamuts 402, 404, 406, 408, 410, and 412 described above in regard to FIG. 4. The chromaticity diagram 500B includes the input chromaticity (black) and the resulting output chromaticity (grey) achieved using the gamut clipping method described above. In the illustrated chart 500B, the maximum input is greater than the luminance threshold and thus gamut B is utilized.

As mentioned above, the blending matrices are derived values determined based on the location of the primary compared to Rec2020. The blend matrixes in particular are defined so as to place the short and long primaries of the right and left eye channels respectively at a particular desired location. Example methods to determine the blending matrices for each primary are described below.

Figure 6A:
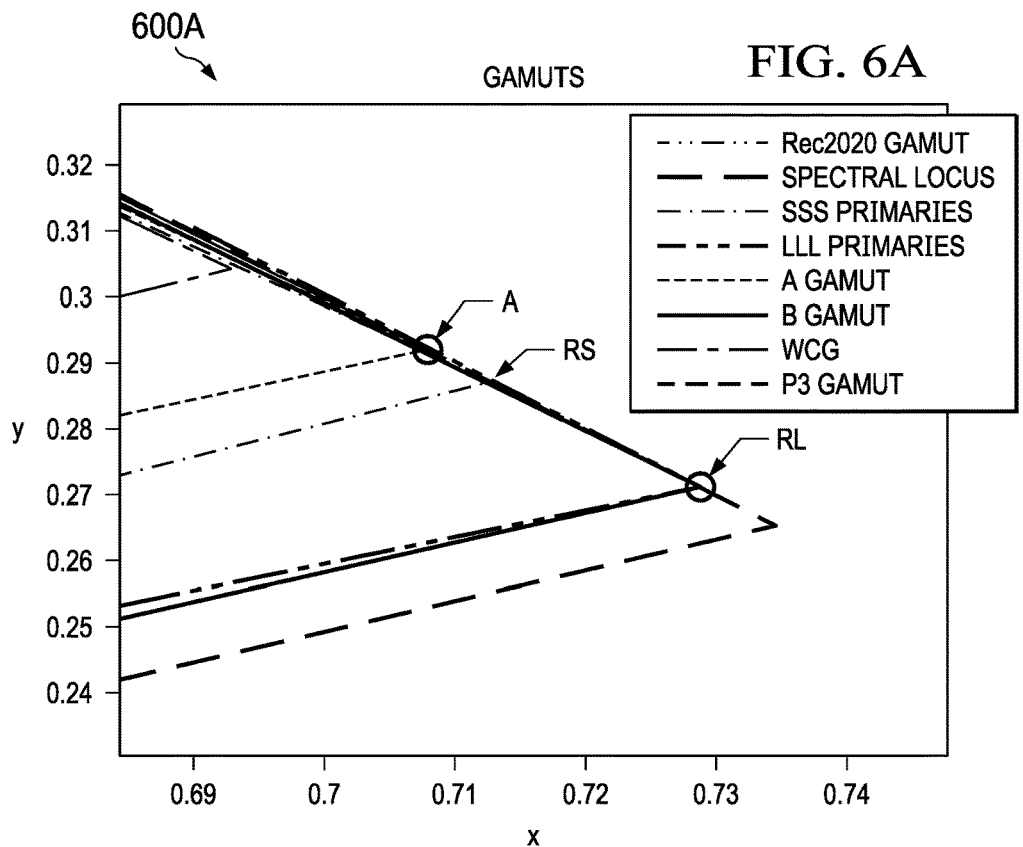
FIG. 6A is a chromaticity diagram according to various aspects of the present disclosure.

FIG. 6A illustrates an enhanced view 600A of the chromaticity diagram 400 of FIG. 4. As shown in the view 600A, both the short red primary RS and the long red primary RL are outside of the Rec2020 color gamut 402. It is necessary to bring gamut A within the Rec2020 color gamut 402. To determine the blend matrix for the red primary R, one method is to bind the primary to the Rec2020 gamut. This may be done by mixing the short red wavelength (RS) with the long green wavelength for gamut A and by mixing the short red wavelength with the long red wavelength (RL) for the B gamut. The distance between the long and short red wavelengths and the Rec2020 boundary is minimized by finding the point of minimum distance between the resulting chromaticity and the Rec2020 boundary or a point of intersection. This location is then used to define the blend matrices. For example, the line of the enhanced view 600A represents the mixture of the long red and short green wavelengths. The dot A represents where the mixture intersects with the Rec2020 gamut.

Figure 6B:
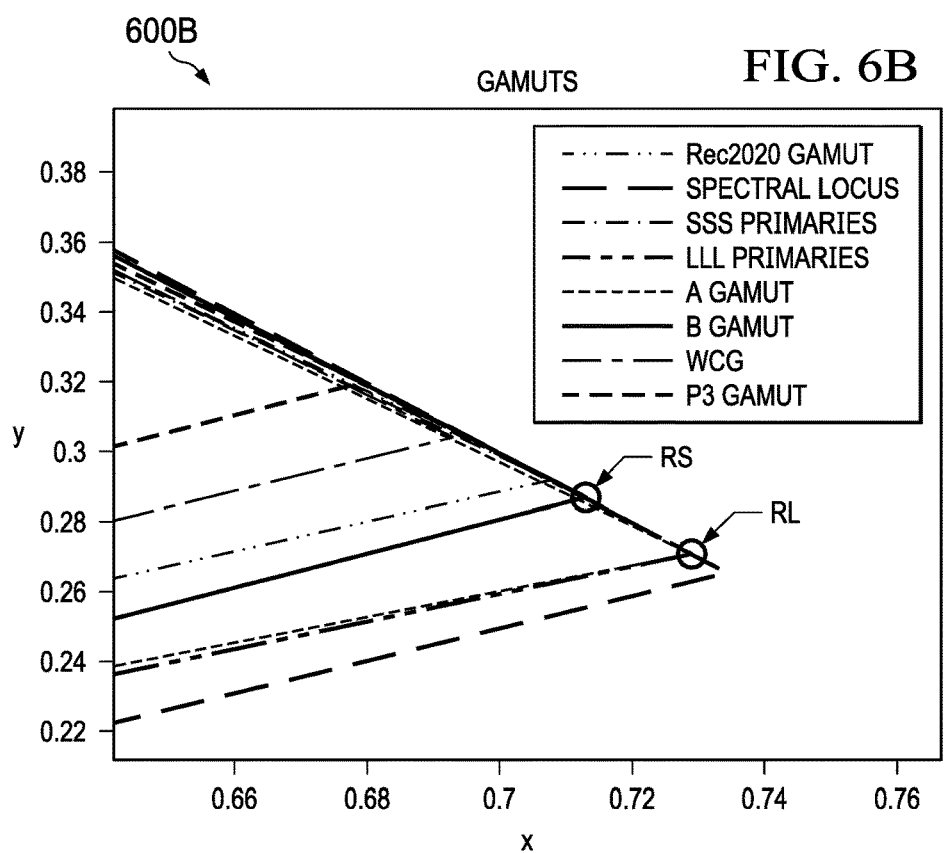
FIG. 6B is a chromaticity diagram according to various aspects of the present disclosure.

Another method is, in order to not be bound to the Rec2020 gamut, to maximize the coverage of the resulting gamut. FIG. 6B illustrates an enhanced view 600B of the chromaticity diagram 400 of FIG. 4. Here, the point of shortest distance from a line between the blue and green primaries of the Rec2020 gamut to the mixture of the long red (RL) and short red (RS) wavelengths. This resulted in using the long red for gamut A and the short red for gamut B.

Figure 7A:
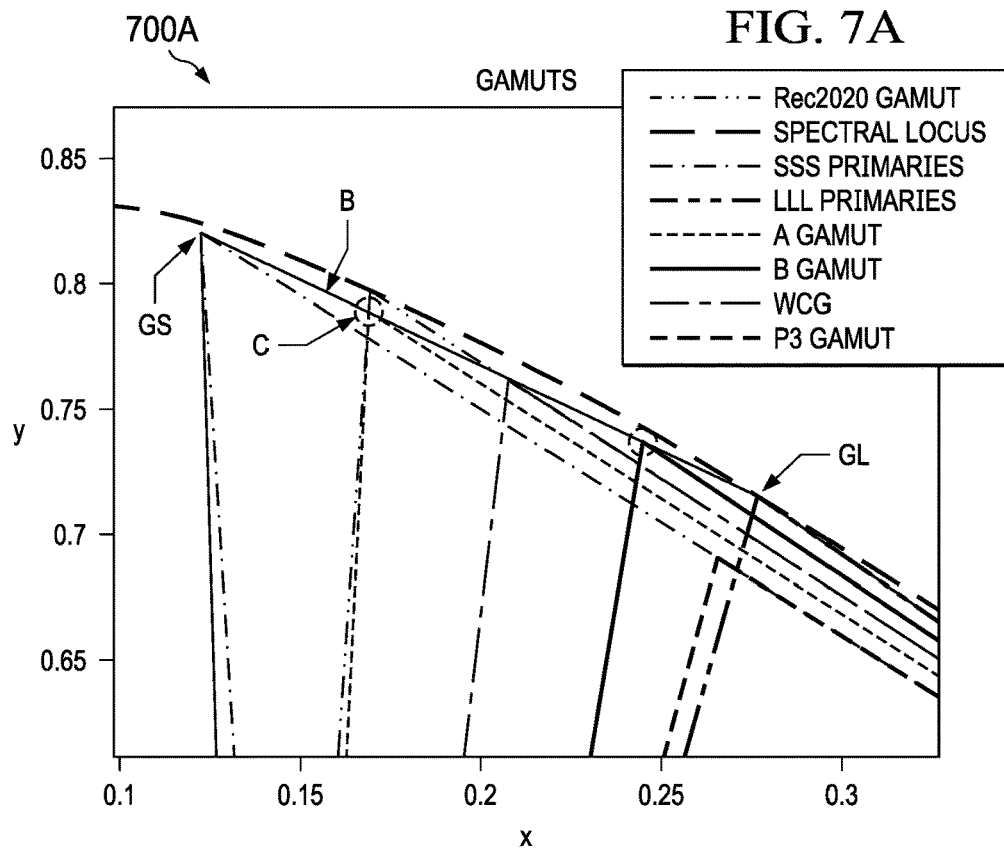
FIG. 7A is a chromaticity diagram according to various aspects of the present disclosure.

FIG. 7A illustrates an enhanced view 700A of the chromaticity diagram 400 of FIG. 4. As shown in the view 700A, both the short green primary GS and the long green primary GL surround the Rec2020 color gamut 402. Again, it is necessary to bring gamut A within the Rec2020 color gamut 402. Here, the primaries are bound to the Rec2020 gamut 402 by defining an intersection point of a line B between the two green primaries with the Rec2020 boundary. This location is then used to define the blend matrices. The green dot C illustrates the point at which the gamut A green primary lies.

Figure 7B:
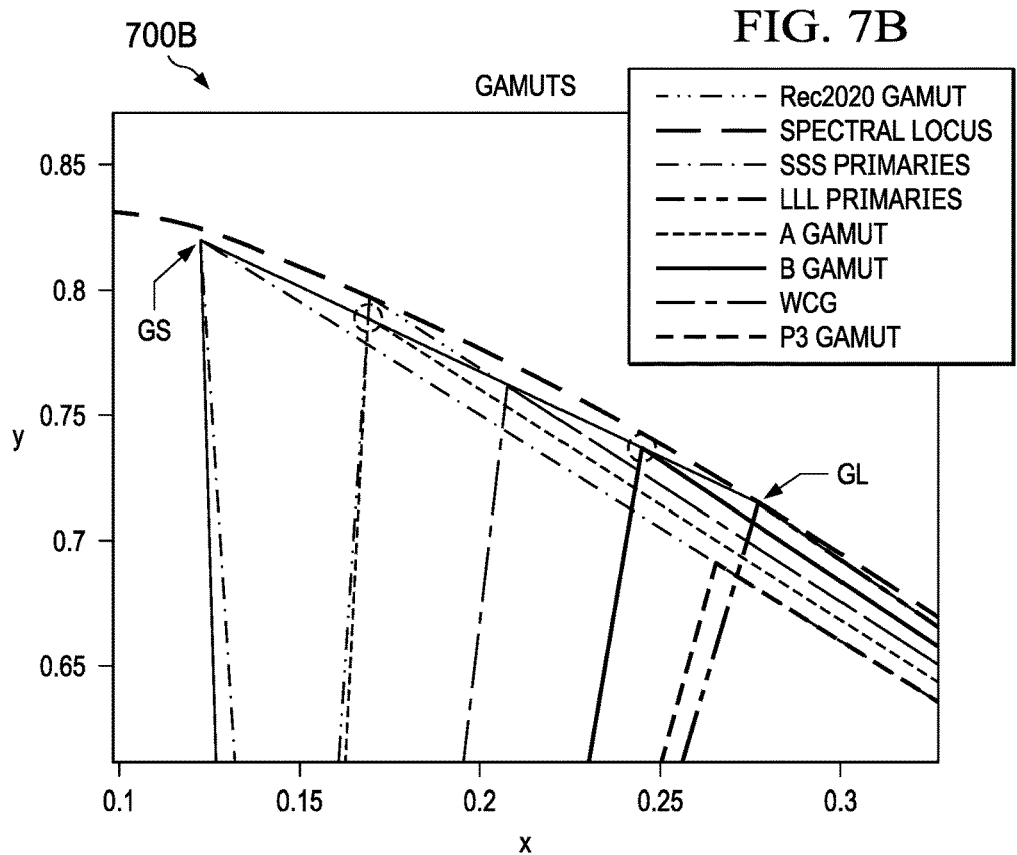
FIG. 7B is a chromaticity diagram according to various aspects of the present disclosure.

Another method is, in order to not be bound to the Rec2020 gamut, to maximize the coverage of the resulting gamut. FIG. 7B illustrates an enhanced view 700B of the chromaticity diagram 400 of FIG. 4. Here, the point of shortest distance from a line between the red and blue primaries of the Rec2020 gamut to the mixture of the long green (GL) and short green (GS) wavelengths. This resulted in using the short green wavelengths.

Figure 8A:
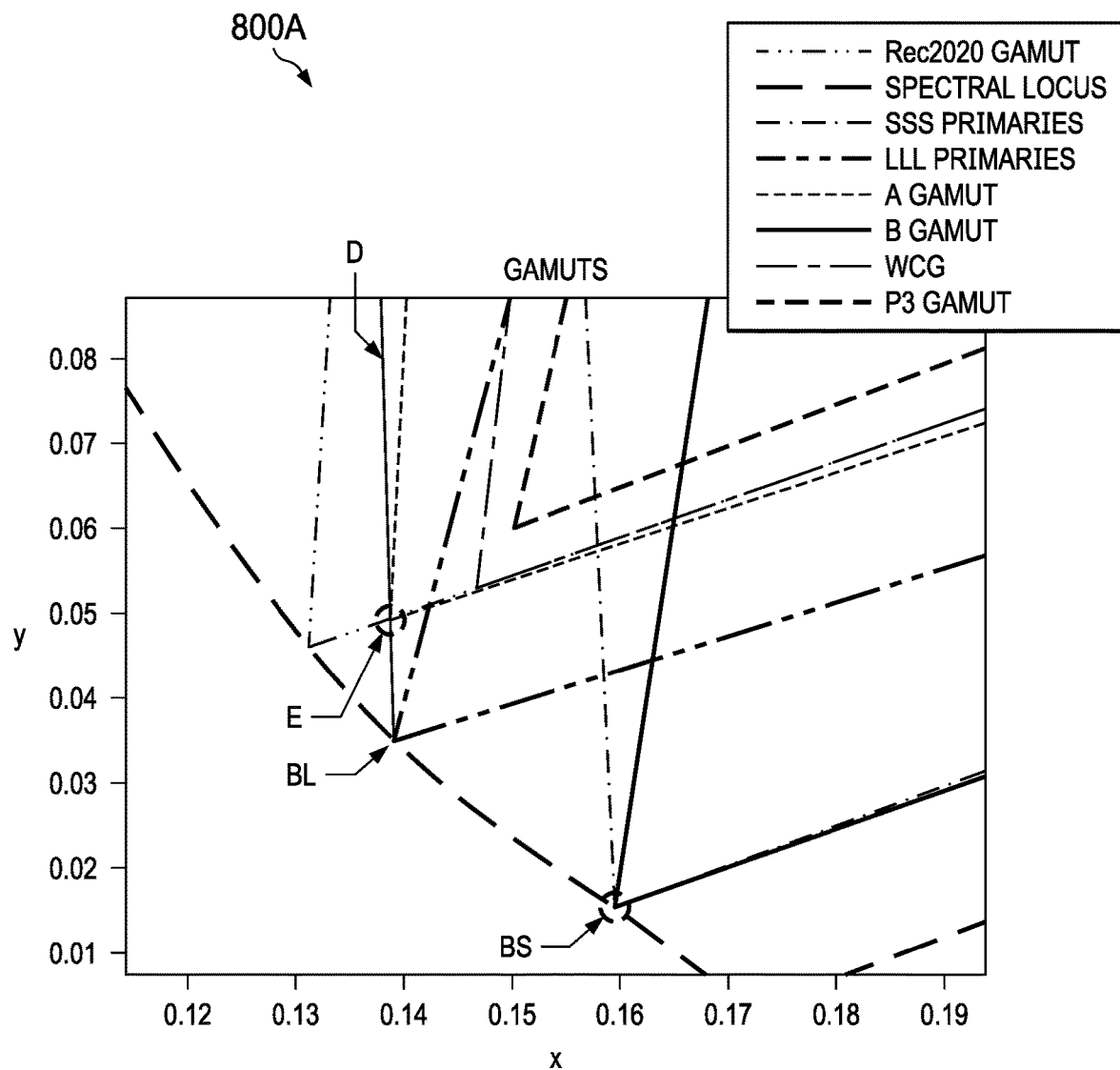
FIG. 8A is a chromaticity diagram according to various aspects of the present disclosure.

FIG. 8A illustrates an enhanced view 800A of the chromaticity diagram 400 of FIG. 4. As shown in the view 800A, both the short blue primary BS and the long blue primary BL lie inside of the Rec2020 color gamut 402. Both primaries are to be out towards the boundary of the Rec2020 color gamut 402. Here, the primaries are bound to the Rec2020 gamut 402 by defining an intersection point of a line D between the long blue primary and the short green wavelength with the Rec2020 boundary. This location is then used to define the blend matrices. The dot E illustrates the point at which the gamut A blue primary lies.

Figure 8B:
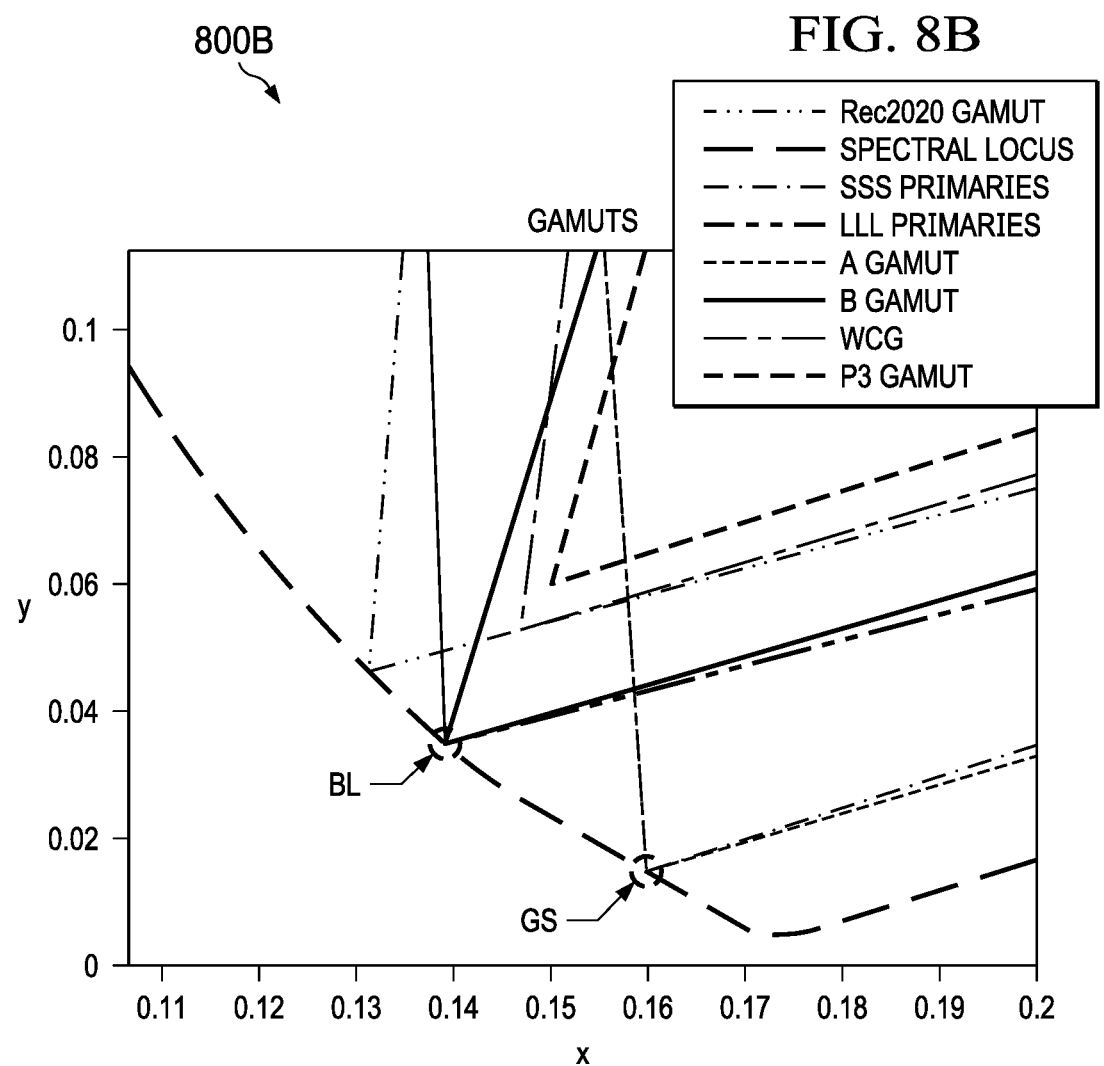
FIG. 8B is a chromaticity diagram according to various aspects of the present disclosure.

Another method is to not bind the blue primaries to the Rec2020 gamut, for example, to maximize the coverage of the resulting gamut. FIG. 8B illustrates an enhanced view 800B of the chromaticity diagram 400 of FIG. 4. Here, the point of shortest distance from a line between the red and green primaries of the Rec2020 gamut to the mixture of the long blue (BL) and short green (GS) wavelengths. This location is then used to define the blend matrices. As illustrated, the long blue primary is used for gamut A while the short blue primary is used for gamut B.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings. For example, the techniques disclosed herein may be applied to projection systems that are designed for non-3D content. For instance, a dual-head projection system may utilize the disclosed technology. Furthermore, the disclosed techniques may be applied to more than two projection heads.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Various aspects of the present invention may be appreciated from the following enumerated example embodiments (EEEs):

1. A dual-head display system comprising:
    a first projection head;
    a second projection head;
    at least one spatial modulator; and
    an electronic processor configured to:
    receive 2D video data;
    generate, from the video data, a first plurality of intensity values of virtual primaries of a first virtual color gamut and a second plurality intensity values of a second virtual color gamut, the first plurality of intensity values being below a luminance threshold and approximating a predefined color gamut and the second plurality of intensity values being above the luminance threshold;
    convert the first plurality of intensity values into a third plurality of intensity values of predefined primaries of the first projection head and the second plurality of intensity values into a fourth plurality of intensity values of predefined primaries of the second projection head; and
    dynamically adjust pixel levels of the at least one spatial modulator of the first and second projection heads based on the third plurality of intensity values and the fourth plurality of intensity values.
2. The system of EEE 1, wherein the luminance threshold is a threshold vector including a threshold for each color channel of the first virtual color gamut.
3. The system of EEE 2, wherein each threshold is determined based on a transform of the first virtual color gamut and the second virtual color gamut to the predefined color gamut.
4. The system of any one of EEEs 1 to 3, wherein any negative values of the first plurality of intensity values and the second plurality of intensity values are clipped.
5. The system of any one of EEEs 1 to 4, wherein any negative values of the third plurality of intensity values and the fourth plurality of intensity values are clipped.
6. A method for displaying image data, the method comprising:
    receiving 2D video data;
    generating, from the video data, a first plurality of intensity values of virtual primaries of a first virtual color gamut and a second plurality intensity values of a second virtual color gamut, the first plurality of intensity values of the first virtual color gamut being below a luminance threshold and approximating a predefined color gamut and the second plurality of intensity values being above the luminance threshold;
    converting the first plurality of intensity values into a third plurality of intensity values of predefined primaries of a first projection head of a display system and the second plurality of intensity values into a fourth plurality of intensity values of predefined primaries of a second projection head of the display system; and dynamically adjusting pixel levels of spatial modulators of the first projection head and the second projection head of the display system based on the third plurality of intensity values and the fourth plurality of intensity values.

7. The method of EEE 6, wherein the luminance threshold is a threshold vector including a threshold for each color channel.

8. The method of EEE 7, wherein each threshold is determined based on a transform of the first virtual color gamut to the predefined color gamut.

9. The method of any one of EEEs 6 to 8, wherein any negative values of the first plurality of intensity values and the second plurality of intensity values are clipped.

10. The method of any one of EEE 6 to 9, wherein any negative values of the third plurality of intensity values and the fourth plurality of intensity values are clipped.

11. The method of any one of EEE 6 to 10, wherein converting the first plurality of intensity values into a third plurality of intensity values and the second plurality of intensity values into a fourth plurality of intensity values is performed via a blending function.

12. A method for displaying image data, the method comprising:

receiving video data;

generating, based on an intensity level of the video data, a first plurality of intensity values associated with a first virtual color gamut;

generating, based on a comparison between the intensity level and at least one predetermined threshold, a second plurality of intensity values associated with a second virtual color gamut;

generating, based on the first plurality and the second plurality of intensity values, a third plurality of intensity values and a fourth plurality of intensity values both configured to approximate a predefined color space associated with the video data; and providing the third plurality of intensity values and the fourth plurality of intensity values to at least one spatial light modulator.

13. The method of EEE 12, wherein, in a case where the intensity level does not exceed the predetermined threshold, the second plurality of intensity values are set to zero.

14. The method of EEEs 12 or 13, wherein the second plurality of intensity values are set based on an amount that the intensity level exceeds the predetermined threshold, when the intensity level exceeds the predetermined threshold.

15. The method of any one of EEEs 12 to 14, the method further comprising: modifying either or both of the first plurality of intensity values and the second plurality of intensity values when at least one intensity value is outside of an achievable gamut volume of the first virtual gamut and the second virtual gamut.

16. The method of any one of EEEs 12 to 15, the method further comprising: modifying either or both of the third plurality of intensity values and the fourth plurality of intensity values when at least one intensity value is outside of an achievable gamut volume of the first virtual gamut and the second virtual gamut.

17. The method of any one of EEEs 12 to 16, wherein the at least one predetermined threshold is a vector based on a relationship between the first virtual color gamut and the second virtual color gamut in the predefined color space.

18. The method of any one of EEEs 12 to 17, the method further comprising defining the first virtual color gamut based on a combination of a plurality of primary display colors associated with a light source to approximate a predefined color gamut associated with the predefined color space, and the second virtual color gamut based on residual power of the light source and the first virtual color gamut.

19. The method of any one of EEEs 12 to 18, wherein the at least one spatial light modulator is a part of a dual-head projector.

20. The method of EEE 19, wherein the dual-head projector displays a 2-D image based on the third plurality of intensity values and the fourth plurality of intensity values.

21. A non-transitory computer-readable medium storing instructions that, when executed by a processor of a computer, cause the computer to perform operations comprising:

receiving 2D video data including tristimulus pixel values of predefined primaries of a predefined color space;

generating, from the video data, a first plurality of intensity values of virtual primaries of a first virtual color gamut and a second plurality intensity values of a second virtual color gamut to approximate a predefined color gamut, the first plurality of intensity values being below a luminance threshold of the first virtual color gamut and the second plurality of intensity values being above the luminance threshold;

converting, via a blending function, the first plurality of intensity values into a third plurality of intensity values of the predefined primaries and the second plurality of intensity values into a fourth plurality of intensity values of the predefined primaries; and dynamically adjusting pixel levels of at least one spatial modulator of a dual-head projection system based on the third plurality of intensity values and the fourth plurality of intensity values.

What is claimed is:

1. A dual-head display system comprising:
   a first projection head;
   a second projection head;
   at least one spatial modulator; and
   an electronic processor configured to:
      receive 2D video data;
      generate, from the video data, a first plurality of intensity values of virtual primaries of a first virtual color gamut and a second plurality of intensity values of virtual primaries of a second virtual color gamut, the first plurality of intensity values being below a luminance threshold and approximating a predefined color gamut and the second plurality of intensity values being above the luminance threshold;
      convert the first plurality of intensity values and the second plurality of intensity values into a third plurality of intensity values of predefined primaries of the first projection head and convert the first plurality of intensity values and the second plurality of intensity values into a fourth plurality of intensity values of predefined primaries of the second projection head;
      clip any negative values of the third plurality of intensity values and the fourth plurality of intensity values; and
      dynamically adjust pixel levels of the at least one spatial modulator of the first and second projection heads based on the third plurality of intensity values and the fourth plurality of intensity values.

2. The system of claim 1, wherein the luminance threshold is a threshold vector including a threshold for each color channel of the first virtual color gamut.

3. The system of claim 2, wherein each threshold is determined based on a transform of the first virtual color gamut to the predefined color gamut.

4. The system of claim 1, wherein the dual-head display system is configured to display a 2-D image based on the third plurality of intensity values and the fourth plurality of intensity values.

5. A method for displaying image data, the method comprising:
receiving 2D video data;
generating, from the video data, a first plurality of intensity values of virtual primaries of a first virtual color gamut and a second plurality of intensity values of virtual primaries of a second virtual color gamut, the first plurality of intensity values of the first virtual color gamut being below a luminance threshold and approximating a predefined color gamut and the second plurality of intensity values being above the luminance threshold;
converting the first plurality of intensity values and the second plurality of intensity values into a third plurality of intensity values of predefined primaries of a first projection head of a display system, and converting the first plurality of intensity values and the second plurality of intensity values into a fourth plurality of intensity values of predefined primaries of a second projection head of the display system;
clipping at least one negative value of the third plurality of intensity values and/or at least one negative value of the fourth plurality of intensity values; and
dynamically adjusting pixel levels of at least one spatial modulator of the first projection head and the second projection head of the display system based on the third plurality of intensity values and the fourth plurality of intensity values.

6. The method of claim 5, wherein the luminance threshold is a threshold vector including a threshold for each color channel of the first virtual color gamut.

7. The method of claim 6, wherein each threshold is determined based on a transform of the first virtual color gamut to the predefined color gamut.

8. The method of claim 5, wherein converting the first plurality of intensity values and the second plurality of intensity values into the third plurality of intensity values and converting the first plurality of intensity values and the second plurality of intensity values into the fourth plurality of intensity values is performed via a blending function.

9. The method of claim 5 further comprising: modifying either or both of the first plurality of intensity values and the second plurality of intensity values when at least one intensity value is outside of an achievable gamut volume of the first virtual color gamut and the second virtual color gamut.

10. The method of claim 5 further comprising: modifying either or both of the third plurality of intensity values and the fourth plurality of intensity values when at least one intensity value is outside of an achievable gamut volume of the first virtual color gamut and the second virtual color gamut.

11. The method of claim 5 further comprising: defining the first virtual color gamut based on a combination of a plurality of primary display colors associated with a light source to approximate a predefined color gamut associated with a predefined color space and defining the second virtual color gamut based on residual power of the light source and the first virtual color gamut.

12. The method of claim 11, wherein the predefined color gamut is a Rec2020 gamut.

13. The method of claim 11, wherein the 2D video data is associated with a color gamut defined by a predefined number of primary colors and wherein the number of primary display colors is twice as large as the predefined number of primary colors associated with the 2D video data.

14. A non-transitory computer-readable medium storing instructions that, when executed by a processor of a computer, cause the computer to perform operations according to claim 5.

* * * * *